Patented July 30, 1940

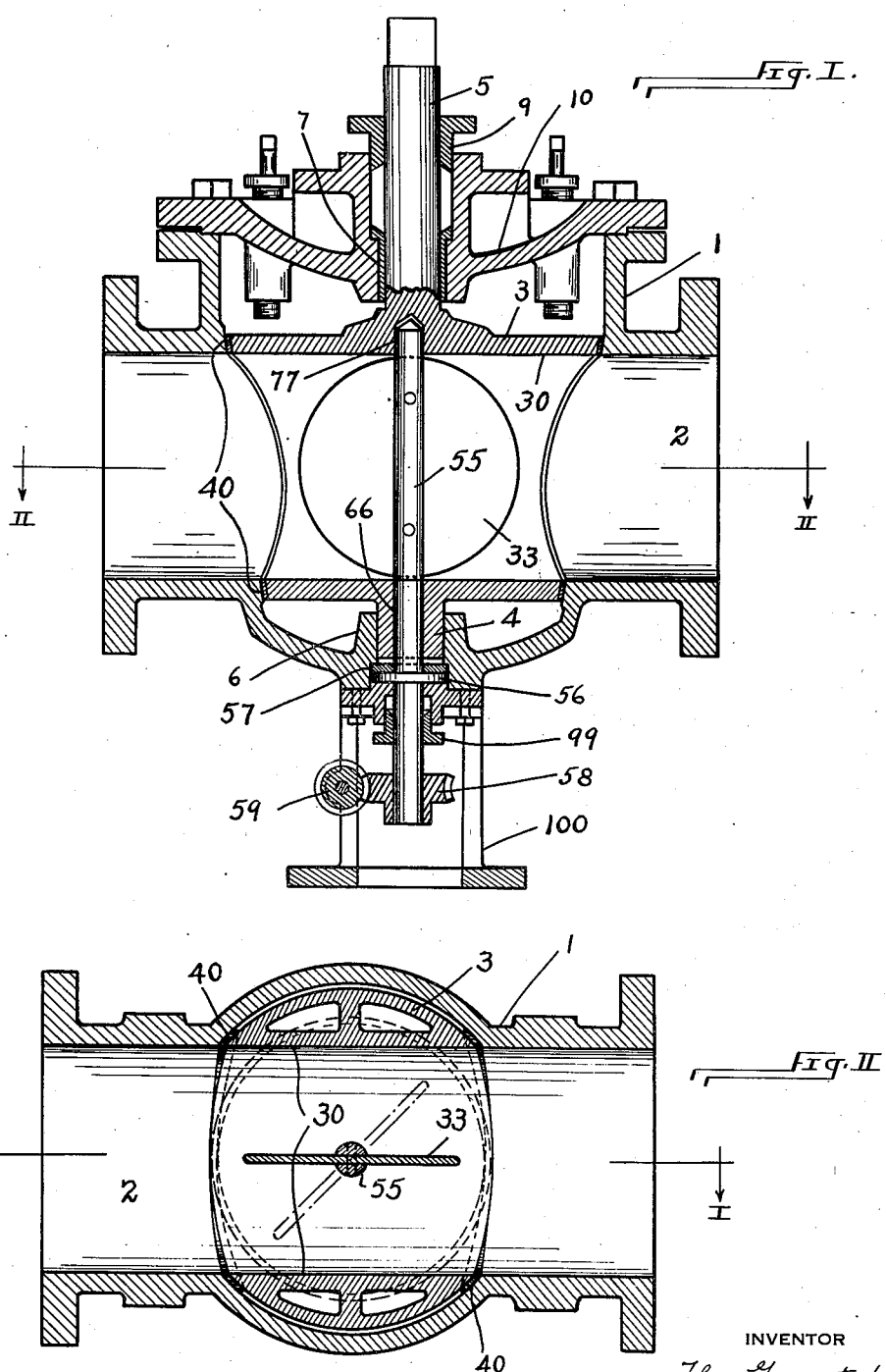

2,209,397

UNITED STATES PATENT OFFICE 2,209,397

VALVE

Thor Gannestad, Pittsburgh, Pa.

Application August 15, 1938, Serial No. 224,901

2 Claims. (Cl. 277—69)

My invention relates to valves, and consists in an improved organization of an auxiliary gate for regulating the flow of fluid when the main gate of the valve is in open position.

The invention is particularly directed to cone-valves, valves whose flow-controlling member consists in a transversely ported conical plug, and in such embodiment I shall describe the invention.

In the accompanying drawing Figs. I and II are views in longitudinal section of a cone-valve embodying the invention, the plane of section of Fig. I being indicated at I—I in Fig. II and that of Fig. II at II—II in Fig. I.

The valve consists essentially in body 1 including a passage 2 and a conical plug-valve 3. The body 1 is flanged at its opposite ends for connection in the conduit in which flow of liquid or gas is to be controlled.

The body 1 of the structure includes a conical seat 40 for the valve 3, and such valve includes a transverse port or passage 30. The valve 3 is rotatable, between a position in which the port 30 is aligned with the passage 2 (in which position the passage is open to flow, as shown), and a position in which the port 30 lies at 90 degrees to the passage 2 (in which position communication between the port and the passage is blanked and the passage closed to flow).

The conical valve 3 is provided with the usual rigid journal 4 and stem 5, respectively trunnioned in bearings 6 and 7. The journal 4 and bearing 6 are enclosed in the body of the valve structure, while the stem 5 extends through the bearing 7. The stem 5 is sealed in the bearing, by means of a packing gland 9, the packing used with the gland being omitted from the drawing for the sake of clarity in illustration. Both the bearing 7 and packing gland 9 are embodied in or carried by an integrally formed head-plate or wall portion 10 that, as shown, is rigidly assembled and sealed upon the valve body proper.

The valve 3 is normally secured tightly upon its conical seat 40. In order to facilitate the rotation of the valve between its alternate positions of service, the valve is axially withdrawn from its seat a slight but sufficient interval, and when it has been so shifted away from its seat, it is rotated through 90 degrees. Then, the valve is shifted back into tightly seated position. Means are organized with the projecting end of the stem for so operating the valve, but since the invention is not immediately concerned with such means, I have not illustrated them. Suffice it to say that the valve may be either manually operated, say by means of the mechanism described in Letters Patent No. 2,094,066, granted to me on September 28, 1937, or mechanically operated, say by means of the machine disclosed in Letters Patent No. 2,034,291, granted to me on March 17, 1936.

I provide an auxiliary valve or gate for regulating the flow through the passage 2, when the main-valve 3 stands in open position. The great practical value of such elaboration in valve construction will be manifest to those skilled in the art.

Advantageously, the auxiliary valve consists in a gate 33 mounted, in the port 30 of main-valve 3, upon an auxiliary valve-stem 55. In this case the gate is circular in plan, having a diameter slightly less than that of the port 30. The gate-supporting stem 55 extends on the axis of the main-valve 3, and, journaled at the points 66 and 77 in the body of the main-valve, is rotatable independently of such main-valve for regulating the effective area of the part 30. The auxiliary stem projects outward from the main-valve, on opposite side thereof from which main-stem 5 projects; a rigid collar 56 on the auxiliary stem, secured against a thrust bearing 57 in the body 1 of the valve structure, serves to prevent axial movement of the stem; and outward of such collar a packing gland 99 seals the assembly against leakage.

The auxiliary valve-stem may be rotated either manually or mechanically. In exemplary way, I show a worm-gear 58 secured on the projecting end of the stem, meshing with a worm-pinion 59 rotatably borne by a spider 100 rigid with body 1. By means of a crank or hand-wheel (not shown), the pinion may be rotated and the gate 33 turned on the common axis of the compound valve (3 and 33) into desired position in the port 30. By virtue of such structure, the effective area of the passage through the valve structure may be regulated with precision, without distributing the main-valve 3 tightly wedged (in open position) upon its seat 40.

Manifestly, either valve (3 or 33) may be operated independently of the other, and it is important to note that there is a slight clearance between the periphery of the gate and the wall of port 30 in valve 3, to permit the axial shifting of valve 3 to and from its seat 40. Within the range of such shifting the body of valve 3 slides upon the auxiliary stem 55. It is equally apparent without illustration that, alternately, the auxiliary stem 55 may be arranged axially to shift in unison with the valve 3, it being necessary merely to provide a clearance between the collar 56 on the stem and the bearing disc 57.

It will be understood that many modifications in the structure and organization of the auxiliary valve 33 may be adopted without departing from the invention defined in the appended claims.

I claim as my invention:

1. A valve structure including a body with a passage for fluid, a conical valve plug including a transversely extending cylindrical passage, said plug being provided with a valve stem extending from one end of the plug through said valve body and a journal extending from the opposite end of said plug, said journal being sealed in said valve body, said plug being axially movable to and from seated position in said valve body and being rotatable on said stem and journal between a position in which said passage is open to flow and a position in which such passage is closed, an auxiliary valve stem extending inward through the valve body and through the journal of said plug and on common axis with said first-mentioned valve stem and said journal, and a disk mounted on said auxiliary stem within the cylindrical passage in said plug, the periphery of said disk being spaced an interval from the wall of the passage in said plug, providing a clearance adapted to admit of the axial movement of said plug relatively to said auxiliary valve stem when said plug is axially shifted relatively to its seat in said valve body.

2. A valve structure including a body with a passage for fluid, a ported, conical valve plug provided with a valve stem extending from the larger end of the plug and being of substantially smaller diameter than such end of the plug, said stem extending through said valve body, a journal extending from the smaller end of said plug and being of substantially smaller diameter than said smaller end of the plug and extending into said valve body, said plug being rotatable on said stem and journal between a position in which said passage is open to flow and a position in which said passage is closed, an auxiliary valve stem of still smaller diameter than said journal and extending inward through the journal on common axis therewith and with said first-mentioned valve stem, said auxiliary valve stem supporting within the port in said valve plug an auxiliary valve member, and a packing arranged on said auxiliary stem outward from the end of said journal and serving as a seal for both said journal and said auxiliary stem.

THOR GANNESTAD.